Jan. 7, 1958    G. D. McLEOD ET AL    2,819,290
PREPARATION OF TRIALKYL TRITHIOPHOSPHITES
Filed March 27, 1953
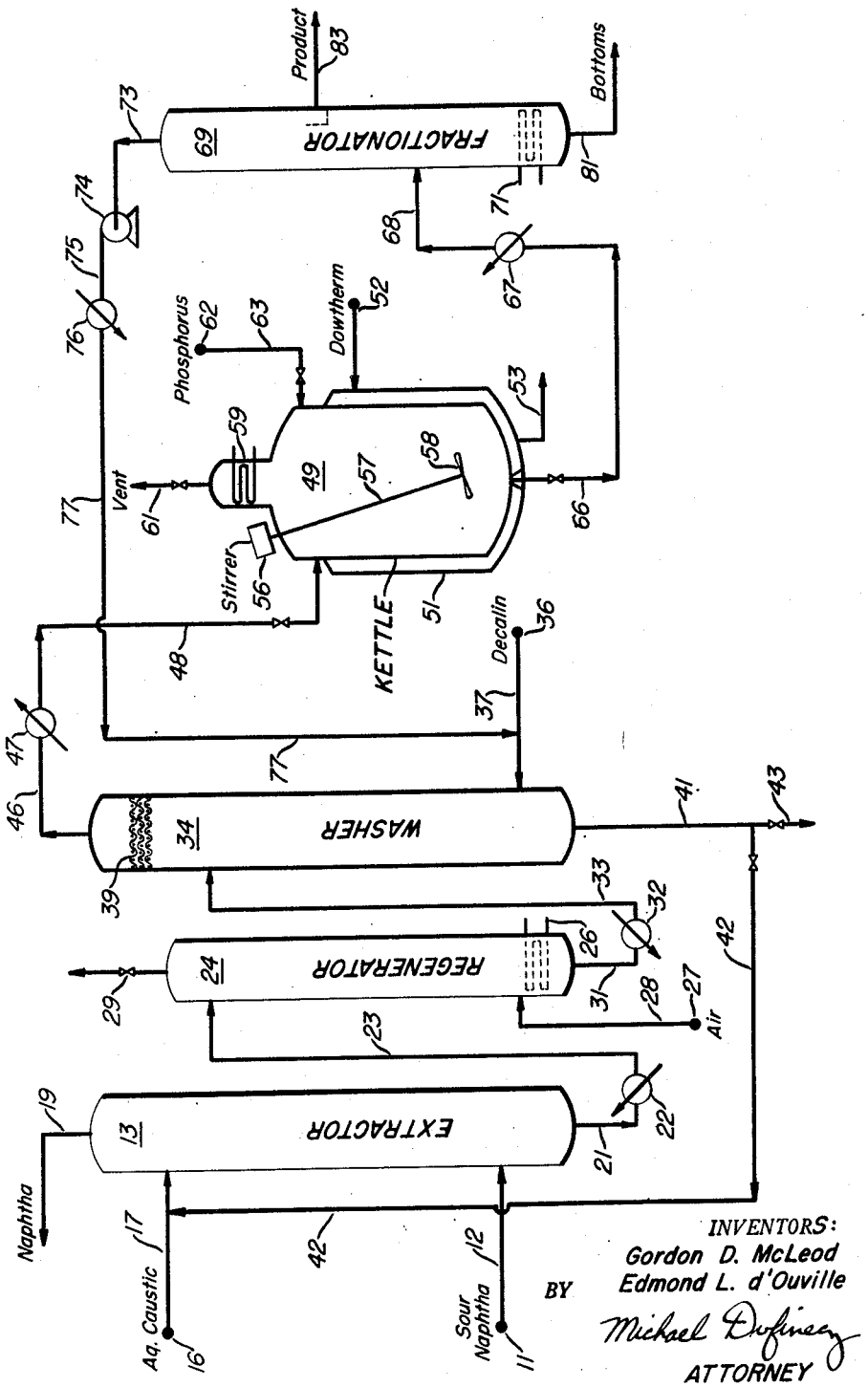
INVENTORS:
Gordon D. McLeod
Edmond L. d'Ouville
BY
Michael Dufinsey
ATTORNEY

# United States Patent Office 2,819,290
Patented Jan. 7, 1958

2,819,290

PREPARATION OF TRIALKYL TRITHIOPHOSPHITES

Gordon D. McLeod, Lansing, and Edmond L. d'Ouville, La Grange, Ill., assignors to Standard Oil Company, Chicago, Ill., a corporation of Indiana Application March 27, 1953, Serial No. 345,102

10 Claims. (Cl. 260—461)

This invention relates to the production of organic trithiophosphites by the reaction of an organic disulfide with elemental phosphorus. More particularly the invention relates to the production of alkyl trithiophosphites by the reaction of an alkyl disulfide with elemental phosphorus in the presence of a solvent for the disulfide.

Organic trithiophosphites are known to be effective lube oil additives, particularly for heavy duty lubrication. Recently certain of the trialkyl trithiophosphites have been found to be particularly useful for a classified military purpose.

Ostensibly, the petroleum refining industry has available a vast supply of hydrocarbon disulfides such as alkyl disulfides, aryl disulfides, alkaryl disulfides, aralkyl disulfides and cycloalkyl disulfides. These disulfides are produced by the conversion of the corresponding mercaptans, which mercaptans have been removed from petroleum fractions such as naphthas, kerosenes and diesel oils. Generally the mercaptans are removed from the petroleum fraction by contacting said fraction with aqueous alkali hydroxide solution; the solution is regenerated by oxidizing the alkali metal-mercaptide contained therein to the corresponding disulfides, which disulfides are relatively insoluble in the alkali hydroxide solution. The insoluble disulfides are decanted from the alkali hydroxide solution. However, appreciable quantities of disulfides remain in the alkali hydroxide solution. Normally these disulfides are removed therefrom by washing the solution with a petroleum fraction such as naphtha or kerosene.

The most economical procedure for the preparation of the corresponding trithiophosphites would be to react the dissolved disulfides with elemental phosphorus in the presence of the solvent naphtha or solvent kerosene. The product trithiophosphite is very readily separated from the solvent naphtha or solvent kerosene by vacuum distillation. This procedure theoretically would avoid any decomposition of disulfide to form mercaptan during the distillative separation of the solvent naphtha or solvent kerosene from the dissolved disulfide. However, it has been found that it is completely impractical to produce trithiophosphites by the method described in this paragraph.

An object of this invention is the production of organic trithiophosphites by the reaction of an organic disulfide with elemental phosphorus. A particular object of the invention is the production of organic trithiophosphites by the reaction of an organic disulfide with elemental phosphorus in the presence of a solvent for said disulfide. Another object is the preparation of alkyl trithiophosphites by the reaction of an alkyl disulfide with elemental phosphorus in the presence of a solvent for said disulfide, which solvent is inert to said disulfide and said phosphorus. Another particular object is a process for washing hydrocarbon disulfides from an aqueous alkaline solution containing hydrocarbon disulfides and reacting said disulfides with elemental phosphorus in the presence of said wash liquid to form corresponding hydrocarbon trithiophosphites. Other objects of the invention will become apparent in the course of the detailed description thereof.

The process of this invention produces an organic trithiophosphite by reacting elemental phosphorus with an organic disulfide, in the substantial absence of other organic compounds reactive with phosphorus, at a temperature above the temperature of simple solution of phosphorus in said disulfide and below the decomposition temperature of the product trithiophosphites, which reaction is carried out in the presence of a solvent selected from the class consisting of cycloparaffins and methyl cycloparaffins such as cyclohexane, decalin, dimethyl cyclohexane and methyl decalin.

The simplest method for the preparation of an organic trithiophosphite consists in the reaction of the corresponding organic disulfide with elemental phosphorus. This reaction is taught by Stevens and Spindt, U. S. 2,542,370, issued February 20, 1951.

A wide variety of disulfide compounds may be reacted with phosphorus to produce trithiophosphite compounds. For the purposes of this invention it is preferred to utilize hydrocarbon disulfides having the general formula R—S—S—R' wherein R and R' are hydrocarbon groups selected from the class consisting of alkyl, aryl, alkaryl, aralkyl and cycloalkyl. It is to be understood that R and R' may be the same or different groups selected from the above class, i. e., the hydrocarbon disulfide may be symmetrical or unsymmetrical. Examples of suitable disulfides are di-dodecyl disulfide, methyl hexyl disulfide, di-phenyl disulfide, di-naphthyl disulfide, di-cyclohexyl disulfide and amyl phenyl disulfide.

Particularly useful for the purposes of the invention are the lower molecular weight dialkyl disulfides, i. e., wherein the alkyl group contains from 1 to 4 carbon atoms. Examples of this preferred class are dimethyl disulfide, methyl ethyl disulfide, diethyl disulfide, di-n-propyl disulfide and ethyl isopropyl disulfide.

In addition to the above disulfides it has been found that a most useful mixture of trithiophosphites is obtained by reacting a natural mixture of disulfides. This natural mixture is obtained by extraction of a sour petroleum naphtha with aqueous caustic solution to obtain an aqueous caustic solution containing a mixture of mercaptides; converting these mercaptides to a corresponding mixture of disulfides; and reacting these disulfides with elemental phosphorus according to the procedure of this invention. It is preferred to operate with a mixture of disulfides which is composed substantially of alkyl disulfides such as is obtained by the extraction of a thermally cracked naphtha with aqueous caustic.

The reaction of disulfides and elemental phosphorus does not proceed to any practical extent in the presence of a paraffinic solvent such as petroleum naphtha or kerosene; or in the presence of an alkyl aromatic hydrocarbon wherein the alkyl substituent contains 2 or more carbon atoms. When these hydrocarbons are present in the reaction zone the predominant reaction appears to be decomposition of the disulfide to the corresponding mercaptans. It has been discovered that not only does the reaction of disulfide and elemental phosphorus proceed substantially to completion, but also the reaction product is of better quality when the reaction is carried out in the presence of a solvent selected from the class consisting of cycloparaffins and methyl cycloparaffins. The use of alkyl cycloparaffins wherein the alkyl group contains 2 or more carbon atoms has an adverse effect on the reaction similar to that found when the corresponding alkyl aromatic is present in the reaction zone. It is preferred to operate with a solvent which has a boiling point somewhat above the desired reaction temperature, i. e., the use of superatmospheric pressures may thereby be dispensed with. For this reason the preferred cycloparaffin solvents are decalin and the methyl decalins, e. g., methyl decalin and dimethyl decalin (decalin=decahydro-naphthalene, methyl decalin=methyl-(0,4,4)-bicyclodecane, dimethyl decalin=dimethyl-(0,4,4)-bicyclodecane).

The reaction should be carried out under conditions of pressure such that the disulfide and the cycloparaffin solvent are in the liquid state. When operating with the lower boiling point disulfides and cycloparaffins superatmospheric pressures may have to be utilized.

The reaction temperature must be high enough to cause solution of the elemental phosphorus in the disulfide-solvent liquid phase. This temperature will vary with the type of disulfide and/or cycloparaffin solvent present in the reaction zone. The rate of reaction, i. e., the contacting time, is favorably influenced by operation at temperatures above the solution temperature. However, it is necessary to operate below the decomposition temperature of the product trithiophosphites. This upper temperature varies with the type of trithiophosphite being produced. In the case of triethyl trithiophosphite appreciable decomposition occurs at temperatures on the order of 300° C. In general while the temperature range of between about 150° and 250° C. has been found suitable for the purposes of this invention, it is preferred to operate between about 170° and 210° C.

The time needed to substantially complete the reaction between the elemental phosphorus and the disulfide is dependent upon the temperature in the reaction zone and the degree of agitation maintained therein. Since the phosphorus is quite soluble in the disulfide-solvent liquid at the preferred reaction temperatures, the degree of agitation is of importance primarily only in shortening the time of solution of the liquefied phosphorus in the disulfide-solvent liquid. The contacting time needed to attain substantial completion of the reaction is quite long at low temperatures. Thus at about 150° C. a contacting time of 50 hours or more may be required. As the reaction temperature is increased the reaction time decreases quite rapidly. Thus at a temperature of about 200° C. a time of about 2 hours may be sufficient. In general when operating at a temperature between about 170° and 210° C. the reaction time should be between at least about 1 hour and 50 hours, the shorter times corresponding to the higher temperatures. At temperatures below the point of incipient decomposition of the product trithiophosphites prolonged contacting times are not harmful.

The amount of cycloparaffin solvent present in the reaction zone has some effect on the contacting time required to substantially complete the reaction. However, for the preferred amounts of solvent present, the relationship of time and temperature given above is adequate. Beneficial results on the quality of reaction product are obtained when using as little as 10 volume percent of cycloparaffin solvent, based on disulfide. More than this amount is desirable and as much as or even more than 500 volume percent may be used. It is preferred to operate with between about 120 and 250 volume percent of cycloparaffin solvent, based on disulfide. It is to be understood that the amount of solvent present will be in part determined by the amount of disulfide dissolved in the aqueous caustic solution which is the preferred source of the alkyl disulfides used for the preparation of the mixed alkyl trithiophosphite product.

The annexed drawing shows an illustrative schematic embodiment of a preferred operation using the process of this invention. It is to be understood that many items of process equipment such as pumps and valves have been omitted from this illustrative embodiment; these items may readily be added thereto by one skilled in the art.

In the drawing a sour naphtha, i. e., mercaptan containing, boiling between 100° and 385° F. derived from the thermal cracking of a virgin gas oil, from source 11 is passed through line 12 into lower part of extractor 13. Extractor 13 is a vertical cylindrical vessel provided with packing which permits intimate contacting of two immiscible liquids. The packing may be Raschig rings, Berl saddles, alumina spheres, etc., or may be a bubble tray-type arrangement. Extractor 13 may be provided with means for controlling the temperature of the contents if operation at other than atmospheric temperature is desired.

Aqueous NaOH solution from source 16 is passed through line 17 into an upper portion of extractor 13. In this case the aqueous caustic solution contains about 25 weight percent of NaOH. However, the concentration may vary from about 15 weight percent to the saturation content. Instead of NaOH, KOH may be used. Solutizers which increase the solubility of mercaptans in the caustic may be present. It is preferred that the solutizer, if any is used in extractor 13, be of such a type that it is not readily removed from the caustic solution by the cycloparaffin solvent. Petroleum cresols in the form of sodium cresylates are suitable for this use. The amount of aqueous caustic solution relative to sour naphtha may vary depending on the type of naphtha and the conditions of contacting. Herein about 2 volumes of sour naphtha is present per volume of aqueous caustic solution. The refined naphtha which is substantially sweet, i. e., free of mercaptans, is removed from extractor 13 and is passed to storage not shown by way of line 19.

The aqueous caustic-sodium mercaptide solution is withdrawn from extractor 13 and is passed by way of line 21, heat exchanger 22 and line 23 into regenerator vessel 24. Regenerator 24 is provided with an internal heat exchanger 26. In regenerator 24 the mercaptan containing aqueous caustic solution is treated with air from source 27 and line 28. In order to speed up the oxidation of the mercaptans to disulfides, regenerator 24 is operated at an elevated temperature; herein about 175° F. Gases from the regeneration are vented from regenerator 24 by way of valved line 29.

Regenerated aqueous caustic solution which now contains alkyl disulfides are withdrawn from regenerator 24 and passed by way of line 31, heat exchanger 32 and line 33 into an upper portion of washer 34. In order to improve the washing operation the temperature of the disulfide-aqueous mixture is lowered in heat exchanger 32 to about that of cooling water. Washer 34 is a vertical cylindrical vessel provided with packing similar to that of extractor 13.

Commercial grade decalin from source 36 is passed by way of line 37 into a lower portion of washer 34. The amount of decalin charged to washer 34 is such that the final disulfide-decalin solution will contain about 30 volume percent of disulfide. The disulfide-rich solvent solution is passed through a wire mesh coalescer 39 set near the upper end of washer 34. This coalescer removes substantially all the aqueous caustic solution occluded by the disulfide-rich decalin solution.

Disulfide denuded aqueous caustic solution is withdrawn from washer 34 by way of line 41 and is recycled to line 17 by way of valved line 42. Some of the aqueous caustic solution may be discarded by way of line 41 and valved line 43.

Disulfide-rich decalin solution is withdrawn from washer 34 and is passed by way of line 46, heat exchanger 47 and valved line 48. It is to be understood that under some conditions of operation it may be necessary to use disulfide containing decalin as the wash oil in order to attain the desired decalin-to-disulfide ratio. The disulfide-decalin solution is raised to a temperature of about 150° C. in heat exchanger 47. The solution is passed from valved line 48 into reactor 49.

In this embodiment reactor 49 consists of a glass-lined kettle provided with a shell 51 heated by means of a Dowtherm medium circulated by way of lines 52 and 53 through shell 51. The kettle is maintained at a reaction temperature of about 190° C. Kettle 49 is provided with a stirrer means consisting of a driving motor 56, a shaft 57 and a propeller 58. Kettle 49 is also provided with a reflux condenser 59 and a vent 61.

Liquefied yellow phosphorus from source 62 is passed by way of valved line 63 into kettle 49. The phosphorus-disulfide-decalin contents are kept thoroughly agitated until the phosphorus is completely dissolved as the contents of the kettle approach the desired operating temperature of 190° C. Some reaction takes place during the heating of the contents of the kettle to the reaction temperature so that even at the 190° C. reaction temperature, the liquid phase is readily maintained in the kettle by means of the reflux condenser; the kettle is thus maintained at about atmospheric pressure.

Although yellow phosphorus is used herein, other forms of phosphorus may be employed. Red phosphorus is converted to yellow phosphorus at elevated temperatures and may be employed effectively when the reaction is carried out at such elevated temperatures.

The total reaction time in this illustration at this temperature is 4 hours. At the end of this time essentially all the phosphorus has reacted with the disulfide. In order to essentially eliminate the presence of unreacted phosphorus in the product trithiophosphites, a slight excess of disulfide over the theoretical ratio of 1.5 mols per mol of phosphorus is present in kettle 49.

The mixture of reaction products is withdrawn from kettle 49 by way of valved line 66, heat exchanger 67 and line 68. The mixture is charged by way of line 68 into fractionator 69 which is provided with internal heat exchanger 71. Fractionator 69 illustrates schematically the separation of unreacted disulfide and decalin as a single fraction, a product fraction and a heavier fraction of side reaction products. Fractionator 69 is operated under a vacuum of about 1 mm. of Hg to avoid decomposition of the product trithiophosphite.

A decalin-disulfide fraction is taken overhead from fractionator 69 by way of line 73, vacuum pump 74, line 75, cooler 76 and line 77. From line 77 this fraction is recycled by way of line 37 to washer 34. A heavy side-reaction bottoms fraction is passed to storage not shown by way of line 81.

The product trithiophosphites, which in this case consist essentially of trialkyl trithiophosphites containing from 1 to 4 carbon atoms in each alkyl group, are passed by way of line 83 to storage not shown.

It is to be understood that the recovery of mercaptans from sour naphthas is very old in the petroleum art and that the above description is not limiting. It is intended to include within the scope of the invention all the methods known for recovery of mercaptans from sour petroleum fractions and for subsequent conversion to disulfides.

Examples of the results obtainable with the cycloparaffin solvents of this invention and other common hydrocarbon solvents are presented below. With the exception of run 10 the experiments were carried out in a 3-necked glass flask provided with a propeller stirrer. The runs were carried out by (1) flushing the flask with cylinder nitrogen, (2) adding disulfide and solvent to the flask, (3) adding solid yellow phosphorus to the flask, (4) bubbling a slow stream of nitrogen through the liquid in the flask and venting said nitrogen to a hood. The flask was heated to reaction temperature and maintained agitated for a time long enough to convert the phosphorus. In all the experiments an excess of disulfide over the theoretical amount needed to react with the phosphorus was present. At the end of the reaction time the flask was cooled and the mixture of reaction products distilled.

The disulfides used were either (A) C. P. diethyl disulfide or (B) a natural mixture of disulfides obtained by the conversion of mercaptans extracted from a thermal cracked heavy naphtha. The composition of the natural mixture of mercaptans used to produce the mixed disulfides was: methyl, 25 mol %; ethyl, 45%; propyl, 25%; and butyl, 5%.

The solvents were commercial grade purity single compounds except for two mixtures of petroleum products. The kerosene was derived from the distillation of a Mid-Continent crude oil and was of excellent burning quality and high diesel index. The pentasol is an aromatic-rich petroleum fraction used as a solvent and also in spray oils. The non-aromatic components are believed to be mainly alkyl cycloparaffins. The boiling ranges of these materials are given below:

|  | Kerosene | Pentasol |
|---|---|---|
| ASTM Distillation, ° F.: |  |  |
| Initial | 340 | 368 |
| 10% | 380 | 406 |
| 50% | 425 | 449 |
| 90% | 470 | 503 |
| Max | 510 | 566 |
| °API | 42.5 | 20.3 |
| Sulfur, Wt. Percent | 0.09 |  |

The results of this series of runs are listed in the table.

For purposes of comparison a run was made reacting diethyl disulfide with yellow phosphorus in the absence of a hydrocarbon solvent (see run 11). This run was carried out according to the technique shown in U. S. 2,542,370. This run produced a mixture of reaction products that was of black color and contained no unreacted phosphorus. The presence of unreacted phosphorus is readily observed by dipping a glass rod into the liquid and exposing the wetted glass rod into the air; fuming indicates the presence of unreacted phosphorus.

Run 10 was carried out in a closed reactor blanketed with nitrogen at about 6 atmospheres pressure; this was done in order to maintain the cyclohexane solvent in the liquid state. It is of interest that the yields of runs 10 and 11 are substantially identical and that a clear colorless mixture of reaction products was obtained when cyclohexane solvent was used. This is in marked contrast with the black color of the reaction product mixture obtained in the absence of solvent.

The data of runs 3 through 9 clearly show the adverse effect of the paraffinic solvents, i. e., decane and kerosene; the alkyl aromatic solvents butylbenzene and pentasol; and the unsaturated cyclic compounds tetralin and α-pinene. The best that can be said for the yields of trithiophosphite obtained in these particular runs is that they are impractical for commercial purposes.

Runs 1 and 2 show the beneficial effect of the presence of different amounts of decalin on product yield on the color of the mixture of the reaction products. This color is strikingly better than that of the product of run 11 wherein no solvent was present.

In order to approximate the preferred method of obtaining the solvent-disulfide solution, runs 2 and 5 were carried out on a solution obtained by the washing of a disulfide-aqueous caustic solution mixture. In these runs several aliquots of disulfide containing aqueous caustic solution were washed with the solvent until the solvent-disulfide solution contained about 20 volume percent of disulfide. The disulfides used in these runs were substantially identical with the mixed disulfides used in the other runs. It is clear that there is substantially no difference between the results of runs 1 and 2 and runs 4 and 5, respectively. Runs 1 and 4 were carried out by dissolving mixed disulfides directly with the solvent.

These data show (1) that paraffinic hydrocarbons, alkylbenzenes wherein the alkyl group contains 2 or more carbon atoms and unsaturated cyclic hydrocarbons substantially prevent the reaction of phosphorus and disulfide from proceeding to the expected trithiophosphite; (2) that cycloparaffins do not interfere with the expected reaction of phosphorus and disulfide; and (3) the presence of cycloparaffin solvent results in a better quality product, Table

| Run No. | 1 | 2* | 3 | 4 | 5* | 6 | 7 | 8 | 9 | 10 | 11 |
|---|---|---|---|---|---|---|---|---|---|---|---|
| Reaction Charge: | | | | | | | | | | | |
| Phosphorus, g. | 10 | 7 | 10 | 10 | 7 | 10 | 13 | 10 | 10 | 6.5 | 10 |
| Disulfide, Type | Mixed | Mixed | Mixed | Mixed | Mixed | Mixed | Ethyl | Mixed | Mixed | Ethyl | Ethyl. |
| Disulfide, ml | 105 | 60 | 105 | 105 | 60 | 105 | 105 | 105 | 105 | 50 | 105. |
| Solvent, Type | Decalin. | Decalin. | Decane. | Kerosene. | Kerosene. | n-Butylbenzene. | Tetralin. | α-Pinene. | Pentasol. | Cyclohexane. | None. |
| Solvent, ml | 150 | 240 | 150 | 150 | 240 | 150 | 100 | 125 | 150 | 50 | |
| Temperature, °C | 170 | 166 | 165 | 166 | 185 | 167 | 163 | 180 | 190 | 200 | 160. |
| Time, Hours | 30 | 72 | 90 | 74 | 75 | 144 | 34 | 82 | 42 | 2 | 24. |
| Pressure, Atm. | 1 | 1 | 1 | 1 | 1 | 1 | 1 | 1 | 1 | 6 | 1. |
| Reaction Product: | | | | | | | | | | | |
| Color of Mixture | Clear, Straw. | Clear, Straw. | Black | Black | Black | Black | Black | Black | Black | Clear, Colorless. | Black. |
| Phosphorus, unreacted | No | No | Yes | Yes | Yes | Yes | Yes | Yes | Yes | No | No. |
| Trithiophosphite Yield (70°–110° C. at 1 mm.). | 95 | >90 | <5 | <5 | <5 | <15 | <10 | <10 | <5 | 95 | 94. |

*Disulfide-solvent solution prepared by extracting disulfide-aqueous caustic mixture.

as determined by the color of the mixture of reaction products, than is obtained by reacting disulfides and phosphorus in the absence of cycloparaffin solvent.

Thus having described the invention, what is claimed is:

1. A process of producing a trialkyl trithiophosphite, which process comprises reacting elemental phosphorus with a disulfide from the class consisting of dialkyl containing from 1–12 carbon atoms in each alkyl group, diphenyl, dinaphthyl, and dicyclohexyl, in the substantial absence of other organic compounds reactive with phosphorus, in the presence of a solvent selected from the class consisting of cycloparaffins and methyl cycloparaffins, at a temperature between about 150° C. and about 250° C. for a time sufficient to substantially complete the reaction of phosphorus and disulfide and recovering trithiophosphite.

2. The process of claim 1 wherein said solvent is cyclohexane.

3. The process of claim 1 wherein said solvent is methyl decalin.

4. The process of claim 1 wherein said disulfide is dimethyl disulfide.

5. The process of claim 1 wherein said solvent is decalin.

6. The process of claim 1 wherein said disulfide is diethyl disulfide.

7. A process of producing trialkyl trithiophosphite, which process comprises contacting a natural mixture of dialkyl disulfides containing from 1 to 4 carbon atoms in each alkyl group with an amount of elemental phosphorus less than the theoretical, in the substantial absence of other organic compounds reactive with phosphorus, in the presence of decalin at a temperature between about 170° and 210° C. for a time sufficient to substantially complete the reaction of phosphorus and disulfide to produce trialkyl trithiophosphites and distilling the mixture of reaction products to recover unreacted dialkyl disulfide, decalin and trialkyl trithiophosphite.

8. The process of claim 7 wherein said contacting time is between at least about 1 hour and 50 hours, the shorter times corresponding to the higher temperatures.

9. A process of producing organic trithiophosphites, which process comprises (1) contacting a sour naphtha with a concentrated aqueous-alkali hydroxide solution to obtain an aqueous-alkali hydroxide-alkali mercaptide solution, (2) treating said mercaptide solution to convert mercaptans to disulfides, (3) washing said mixture of disulfides and aqueous alkali hydroxide solution with a disulfide solvent selected from the class consisting of cycloparaffins and methyl cycloparaffins, (4) removing occluded aqueous-alkali hydroxide solution from disulfide-solvent solution, (5) contacting said disulfide-solvent solution with an amount of elemental phosphorus less than the theoretical at a temperature between about 150° and 250° C. for a time sufficient to substantially complete the reaction of the phosphorus and disulfide, (6) distilling said reaction product mixture to recover unreacted disulfides, solvent and trialkyl trithiophosphite, and (7) recycling said solvent to the washing zone of step (3).

10. The process of claim 9 wherein said solvent is decalin.

References Cited in the file of this patent

UNITED STATES PATENTS 2,542,370   Stevens et al. _____ Feb. 20, 1951